(12) United States Patent
Abe et al.

(10) Patent No.: US 6,447,246 B1
(45) Date of Patent: Sep. 10, 2002

(54) TORQUE CONVERTER

(75) Inventors: Hiroya Abe; Masatoshi Sakato; Tetsurou Maruyama, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/707,838

(22) Filed: Nov. 8, 2000

(30) Foreign Application Priority Data

Nov. 10, 1999 (JP) .......................................... 11-319137

(51) Int. Cl.⁷ .................................................. F03B 3/00
(52) U.S. Cl. ....................................................... 415/187
(58) Field of Search ................................. 415/187, 191; 416/197 C; 60/330, 361, 364, 366

(56) References Cited

U.S. PATENT DOCUMENTS 4,186,557 A * 2/1980 Arai et al. ..................... 60/361
4,783,960 A * 11/1988 Kubo et al. ................ 60/361 X
4,866,935 A * 9/1989 Hayabuchi et al. ........... 60/631
5,241,820 A * 9/1993 Fukunaga .................. 60/361 X

FOREIGN PATENT DOCUMENTS

JP 57-37791 8/1982
JP 04-254043 9/1992

* cited by examiner

Primary Examiner—John E. Ryznic

(57) ABSTRACT

A torque converter in which a flatness (2L/H) and a torus inside and outside radius ratio (r/R) satisfy the following equations: (1) 0.55<(2L/H)<0.75 and (2) 35<(r/R)<0.40. Then, assuming that an axially central position of the flow path along a rotational shaft of the torque converter is an origin, an axial direction is an X direction and a radial direction is a Y direction, the configuration of the flow path of the turbine member is set such that the position of a point of contact between a straight line inclined 45 degrees relative to the X direction and a curve constituting an external circumference surface of the flow path in the turbine member is located within an area surrounded by two straight lines expressed as (3) $Y=(R/L) \times X + (6/4) \times R$ and (4) $Y=(R/L) \times X + (7/4) \times R$.

2 Claims, 4 Drawing Sheets

TORQUE CONVERTER

BACKGROUND OF THE INVENTION

1. Field of the Invention

The present invention relates to a torque converter comprising an impeller member a turbine member and a stator member, as well as a fluid flow path formed through these three members which has a cross-section formed into an elliptical or flat configuration in which the axial width is less than the diametrical length.

2. Description of the Related Art

In the construction of a torque converter, a flow path is formed through an impeller member, a turbine member and a stator member for circulation of oil. The impeller member is driven to rotate by the engine so as to generate a flow of oil by vanes of the impeller member, so that the oil flow so generated strikes against the turbine vanes to thereby rotate the turbine member. Then, the oil flow emerging from the turbine flows into the impeller member while deflecting the oil flow by vanes of the stator member, whereby the rotational driving force is transmitted from the impeller member to the turbine member. An internal fluid flow path formed generally into a toroidal shape having a circular cross-section has been known as used for the internal flow path of a torque converter as described above. Additionally, a toroidal flow path is also known which has a flattened circular or elliptic cross-section. Thus, hereinafter, a torque converter having a flow path of a circular cross-section is referred to as a circular cross-section torque converter, whereas a torque converter having a flow path of a flat cross-section as a flat cross-section torque converter.

While the flat cross-section converter is advantageous in that the axial dimension can be reduced, it has a shortcoming in that fluid tends not to flow smoothly inside due to its flat flow path, therefore leading to a risk that the performance of the torque converter is deteriorated. To counteract this, conventionally there have been proposals to provide torque converters which are formed as flat as possible without deteriorating the performance of the torque converter, such as torque absorbing capacity and transfer efficiency, some of which are disclosed in, for instance, JP-B-57-37791and JP-A-4-254043.

Here, having a flat torque converter is advantageous not only in reducing the torque converter's axial dimension but also in reducing the weight and production cost thereof. Moreover, reducing the axial dimension of a torque converter facilitates the realization of a multi-step transmission which connects to the torque converter, thereby making it possible to have a better fuel economy as well. To this end, there have conventionally been proposed various types of flat cross-section torque converters, but with those proposals, configurations of torque converters were individually specified under certain conditions, and therefore design methods have been desired which can be applied generally and universally.

SUMMARY OF THE INVENTION

The present invention was made in view of these situations, and an object thereof is to provide an optimal design method for an internal flow path for a flat cross-section torque converter. A further object of the present invention is to provide a flat cross-section torque converter in which the torque converter can be flattened without deteriorating the performance thereof such as torque absorbing capacity and transmission efficiency.

With a view to attaining the above objects, according to the present invention, there is provided a torque converter wherein in an axial cross-section of a fluid flow path formed through an impeller member (for instance, an impeller 11 as described in an embodiment of the invention), a turbine member (for instance, a turbine 12 as described in the embodiment) and a stator member (for instance, a stator 13 as described in the embodiment) which constitute the torque converter, a flatness (2L/H) and a torus inside and outside radius ratio (r/R) which are defined based on a distance 2L between axial ends of the flow path, a maximum radius R, a minimum radius r and a difference H (=R−r) between the maximum radius R and the minimum radius r satisfy equation (1) and equation (2). Moreover, in the axial cross-section, assuming that an axially central position (for instance, point 0 as shown in FIG. 2) of the flow path along a rotational shaft of the torque converter is an origin, an axial direction an X direction and a radial direction a Y direction, the configuration of the flow path is set such that the position of a point of contact (for instance, a point of contact as shown in FIG. 2) between a straight line (for instance, a straight line C as shown in FIG. 2) inclined 45degrees relative to the X direction and a curve (for instance, a curve D as shown in FIG. 2) constituting an external circumference surface of the flow path in the turbine member is located within an area (for instance, a hatched area F as shown in FIG. 2) surrounded by a first straight line (for instance, a first straight line A as shown in FIG. 2) which is expressed by equation (3) and a second straight line (for instance, a second straight line B as shown in FIG. 2) represented by equation (4).

$$0.55 < (2L/H) < 0.75 \tag{1}$$

$$0.35 < (r/R) < 0.40 \tag{2}$$

$$Y = (R/L) \times X + (6/4) \times R \tag{3}$$

$$Y = (R/L) \times X + (7/4) \times R \tag{4}$$

According to results of various calculations and experiments carried out by the inventor of the present invention, in a flat cross-section torque converter which satisfies the equations (1) and (2), not only can the radius of curvature of the curve defining the flow path inside the turbine be reduced but also an internal flow path can be formed which can allow the oil flow therein to deflect smoothly provided that the configuration of the flow path in the turbine member is set such that the position of the point of contact between the straight line inclined 45degrees relative to the X direction and the curve constituting the external circumference surface of the flow path in the turbine member is located within the area surrounded by the first straight line which is expressed by the equation (3) and the second straight line expressed by the equation (4). This can help not only reduce a fluid loss (generation of eddy currents or the like) at an entrance portion to the turbine where a large fluid loss tends to be found but also improve the torque absorbing capacity and transfer efficiency of the torque converter. As a result of this, a torque converter can be obtained which has a flat cross-section and a small axial dimension, and provides a better torque converter performance.

DETAILED DESCRIPTION OF THE PREFERRED EMBODIMENTS

Figure 1:
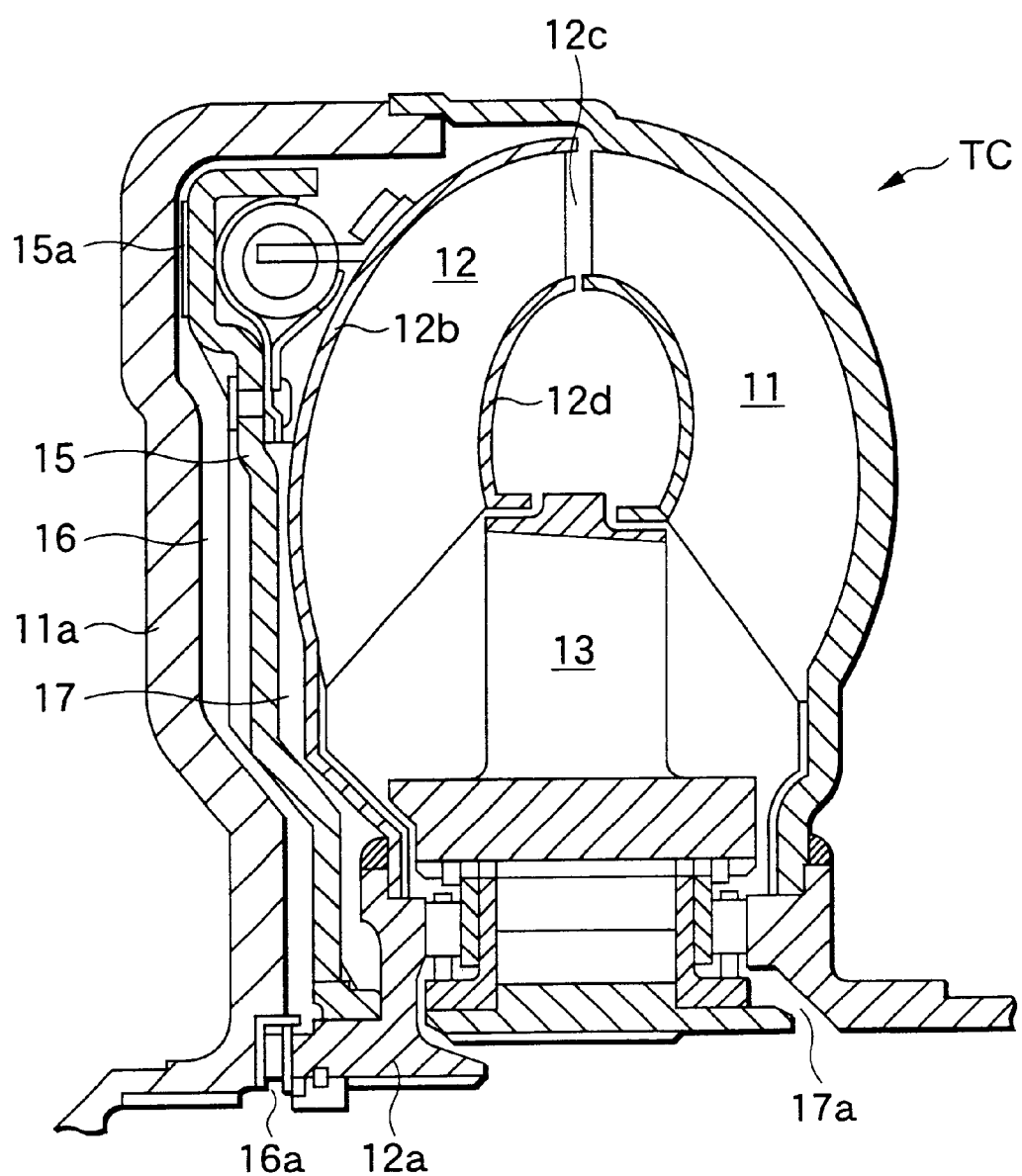
FIG. 1 is a sectional view showing the construction of a torque converter according to the present invention.

Referring to the accompanying drawings, a preferred embodiment of the present invention will be described below. FIG. 1 shows a torque converter TC according to the invention. This torque converter TC has an impeller 11 connected to an output shaft (not shown) of an engine via a converter cover 11a, a turbine 12 disposed as opposed to the impeller 11 and connected to an input shaft of a transmission (not shown) via a turbine hub 12a, and a stator 13 fixedly held. A lock up piston 15 is disposed within a space surrounded by the back of the turbine 12 and an internal surface of the converter cover 11a, a lock up mechanism being thereby constructed. This space is divided into two by the lock up piston 15; a lock up releasing chamber 16 surrounded by the converter cover 11a and the lock up piston 15 and a lock up engaging chamber (a lock up space) 17 surrounded by the back of the turbine 12 and the lock up piston 15. Note that the lock up piston 15 is attached such that it can axially move relative to and rotate together with the turbine hub 12a.

Filled in the torque converter TC is a hydraulic fluid which is supplied from a lock up fluid inlet 16a and a torque converter inlet 17a, and the turbine 12 is driven to rotate when it receives a dynamic pressure generated by the impeller 11 when it is rotated by the engine. When this takes place, a torque from the impeller 11 is amplified and transmitted to the turbine 12 by the action of vanes of the turbine 12 and the stator 13, but because this transmission of torque is effected via a fluid, there is still generated a power transmission loss to some extent even under an operating condition where the impeller 11 and the turbine 12 rotate together. In order to suppress the generation of such a power transmission loss, there is provided a lock up mechanism for allowing both the impeller 11 and the turbine 12 to be connected to each other directly mechanically under the operation condition where they rotate together.

In operating the lock up mechanism, the fluid pressure within the lock up releasing chamber 16 and the lock up engaging chamber 17 is controlled by controlling the pressures of hydraulic fluids supplied from the lock up fluid inlet 16a and the torque converter fluid inlet 17a. For instance, the lock up piston 15 is caused to press against the internal surface of the converter cover 11a by virtue of the fluid pressure within the lock up engaging chamber 17 by reducing the fluid pressure within the lock up releasing chamber 16, whereby the lock up piston 15 and the converter cover 11a are locked up to each other through friction between a clutch friction material 16a provided on a side of the lockup piston 15 and the internal surface of the converter cover 11a. As a result of this, the impeller 11 and the turbine 12 come into engagement with each other to thereby rotate together, the lockup mechanism being thereby put into operation. On the other hand, when the fluid pressure within the lockup releasing chamber 16 is made higher than that within the lockup engaging chamber 17 by supplying hydraulic fluid into the lockup releasing chamber 16 from the lockup fluid inlet 16a, the lockup piston 15 separates from the internal surface of the converter cover 11a generating a lockup released condition, whereby the impeller 11 and the turbine 12 can rotate independently, the torque converter TC being thereby allowed to operate.

In the torque converter constructed as described above, the torque converter performance such as the torque absorbing capacity and transfer efficiency is largely affected by the configurations of the flow path formed through the impeller 11, the turbine 12, and the stator 13 and the respective vanes thereof. In particular, in the case of the flat cross-section torque converter, a fluid loss is easy to be generated at an entrance portion 12c to the turbine 12 due to eddy currents (swirl) that are generated thereat, and the configuration of the flow path inside the turbine 12 defined by an outer shell 12b and an inner shell 12d of the turbine 12 is largely related to the torque converter performance. As a result of this, in the present invention, in consideration of a condition for setting an optimal flow path in particular at the outer shell 12b, a condition is set such that a torque converter is obtained which provides only a small fluid loss at the entrance portion 12c of the turbine 12 and has a flat cross-section.

Figure 2:
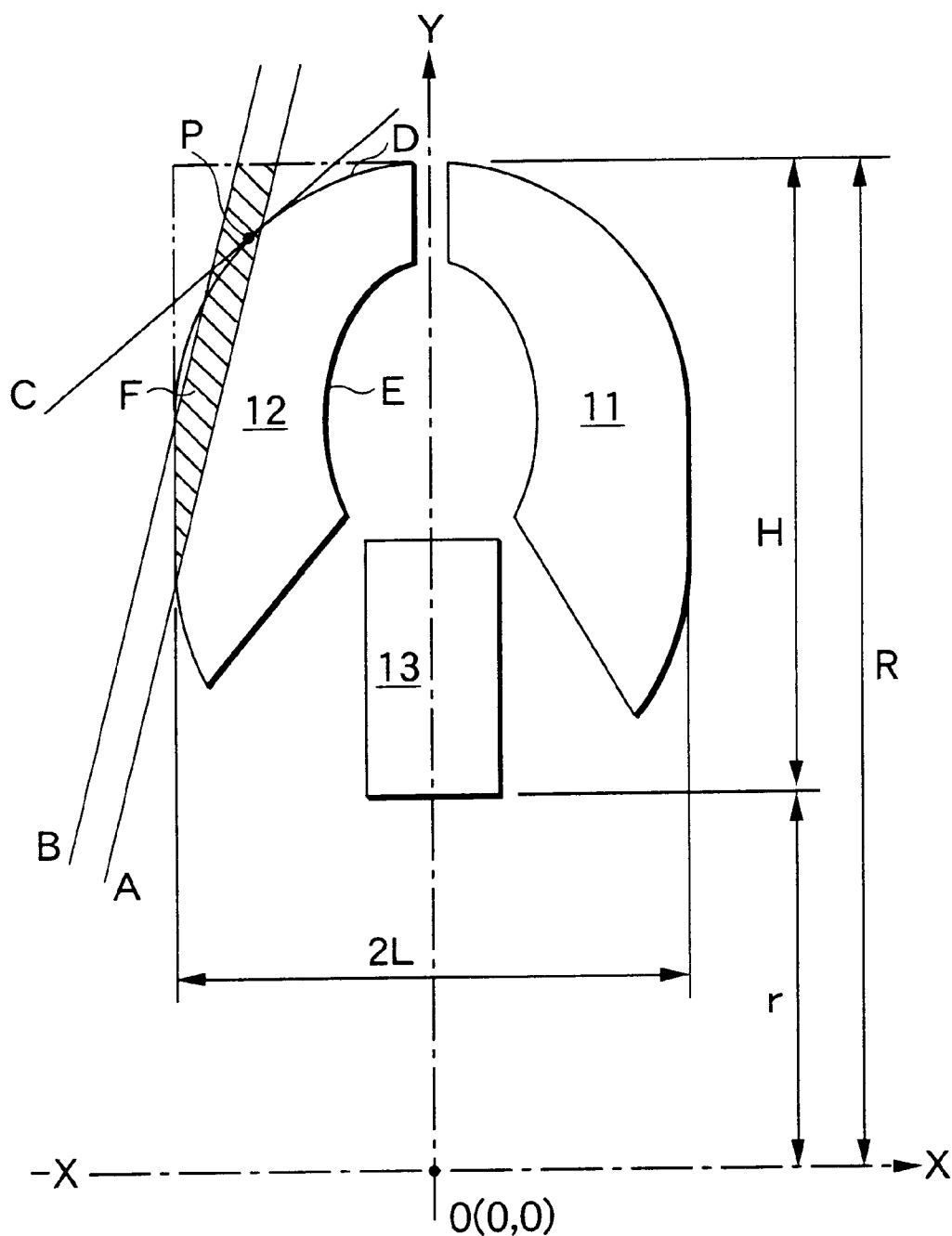
FIG. 2 is a schematic view showing the configuration of an internal flow of the torque converter.

The setting of the condition will be described with reference to FIG. 2. This figure shows an axial cross-section of the configuration of the flow path formed inside the impeller 11, the turbine 12 and the stator 13 of the flat cross-section torque converter described above. As shown in the figure, the torque converter is constructed such that a flatness (2L/H) and a torus inside and outside radius ratio (=R−r) which are defined based on a distance 2L between axial ends of the internal flow path (that is, from an axially right end of the flow path inside the impeller 11 to an axially left end of the flow path inside the turbine 12), a maximum radius R (that is, the maximum outside radius of the flow path through the impeller 11 and the turbine 12), a minimum radius r (that is, the minimum inside radius of the flow path through the stator 13) and a difference H (=R−r) between the maximum radius and the minimum radius satisfy following equation (1) and equation (2).

$$0.55 < (2L/H) < 0.75 \quad (1)$$

$$0.35 < (r/R) < 0.40 \quad (2)$$

Then, in the same figure, assuming that an axially central position of the flow path along a rotational shaft of the torque converter is an origin (0, 0), an axial direction is an X direction (right to the origin is positive), and a radial direction is a Y direction (from the origin up is positive), the outer circumference surface configuration which defines the internal flow path of the turbine is set such that the position of a point P of contact between a straight line C inclined 45degrees relative to the X direction and a curve D (a curve showing the internal configuration of the turbine outer shell 12b) constituting the outer circumferential surface of the flow path of the turbine 12 is located within an area F (an area shown as hatched in FIG. 2) surrounded by a first straight line expressed by equation (3) and a second straight line B expressed by equation (4).

$$Y = (R/L) \times X + (6/4) \times R \quad (3)$$

$$Y = (R/L) \times X + (7/4) \times R \quad (4)$$

Note that in designing a flow path for a torque converter, because a flow path is designed such that the flow path cross-sectional area becomes identical at any cross-sectional position along the length thereof (in other words, such that the speed component of a circulating fluid inside the flow path becomes identical at any position), in the event that the outer circumferential surface configuration is set as described above, so can the internal circumferential surface configuration be done, whereby the internal flow path configuration of the turbine 12 is set.

Figure 3:
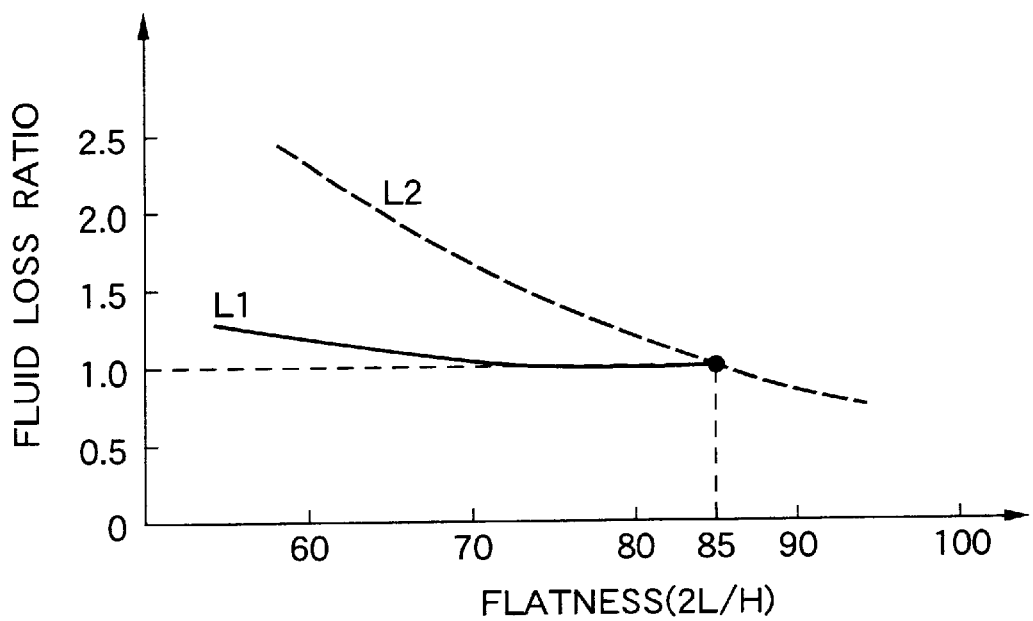
FIG. 3 is a graph showing a relationship between the flatness and the fluid loss over the torque converter according to the invention and a related art torque converter.

Next, the performance and characteristics of the flat cross-section torque converter (the torque converter according to the present invention) will be described which is composed of the turbine having the internal flow path set as described above will be described below. Shown in a solid line L1 in FIG. 3 is a change in fluid loss in the torque converter according to the invention in which the internal flow path configuration is set so as to satisfy the aforesaid condition when the flatness (2L/H) is changed. What is shown there is how the fluid loss changes as the flatness (2L/H) changes with a flatness of 85% being used as a reference (=1.0). As is clear from the solid line L1, in the case of the torque converter of the invention, even when the flatness changes from 85% to 55%, there is generated almost no increase in fluid loss.

Note that a broken line L2 shows a change in fluid loss in a conventional flat cross-section torque converter as its flatness changes. This torque converter is such that the flow path inside the turbine is set so that the point P of contact between the straight line C inclined 45degrees relative to the X direction and the curve D (a curve showing the internal configuration of the turbine, outer shell 12b) constituting the outer circumferential surface of the flow path of the turbine 12 is located inwardly of the first straight line A defined by the above equation (3). In this case, as is clearly understood from FIG. 3, the fluid loss increases relative to the flatness of 85%, and for instance when it increases up to a flatness of 55%, a fluid loss of 2.5times as much as that of the flatness of 85% results.

Figure 4:
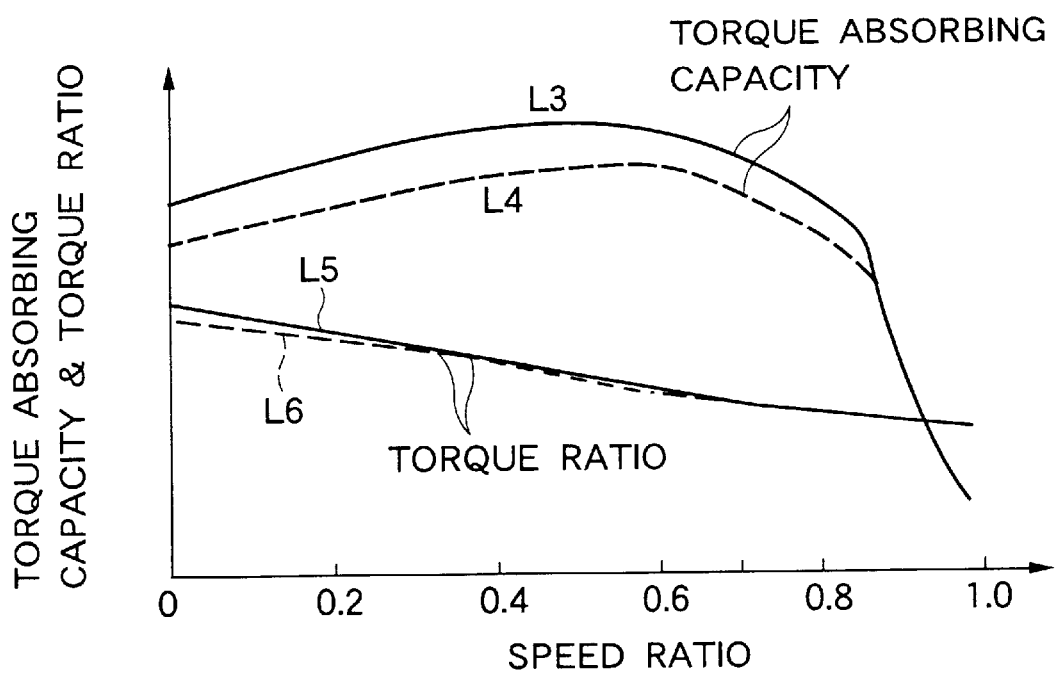
FIG. 4 is a graph showing a relationship between the torque absorbing capacity and the torque ratio over the torque converter according to the invention and the related art torque converter.

Additionally, FIG. 4 shows torque absorbing capacities and torque ratios of the torque converters according to the present invention and the related art, respectively, when the flatness is 75% (a solid line L3 designating the torque absorbing capacity of the invention, a broken line L4 designating that of the related art, a solid line L5 designating the torque ratio of the invention, a broken line L6 designating the torque ratio of the related art). As is understood from this graph, both the torque absorbing capacity and the torque ratio are improved with the torque converter according to the invention. It is considered that the potential of the torque converter is increased as a result of the reduction in fluid loss. As is understood from this fact, according to the present invention, the flatness can be reduced without deteriorating the fluid loss and the torque converter performance.

Furthermore, the pressure distributions inside the torque converter of the present invention and the torque converter of the related art were analyzed through calculations by a computer. According to results of the analyses, it was found that the radius of curvature of the flow path of the related art torque converter was small at the entrance portion to the turbine and therefore that the fluid strikes against the turbine shell at the entrance to the turbine to thereby increase the pressure thereof, this increasing in turn the fluid loss. On the contrary, it was found that because the radius of curvature of the flow path of the torque converter of the invention can be increased at the entrance portion to the turbine, the pressure increase at the entrance portion to the turbine can be suppressed, thereby reducing the fluid loss thereat.

Figure 5:
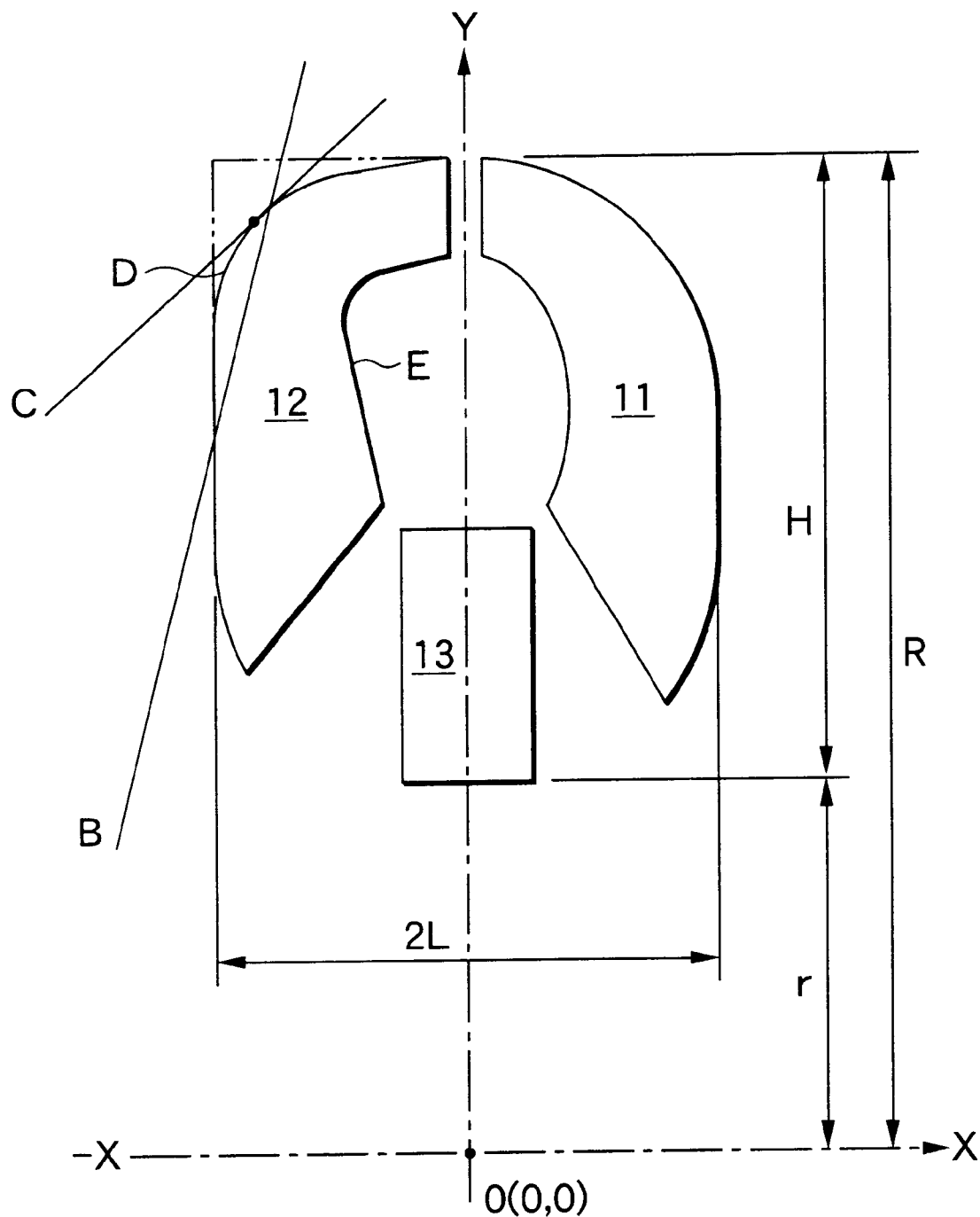
FIG. 5 is a schematic view showing the internal configuration of a turbine which is set out of the condition of the invention.

In the above description, the example was explained as representing related art torque converters in which the flow path inside the turbine is set so that the point of contact between the straight line C inclined 45degrees relative to the X direction and the curve D constituting the outer circumferential surface of the flow path of the turbine 12 is located inwardly of the first straight line A defined by the above equation (3). In contrast, a case where the point of contact is located outwardly of the second straight line B defined by the equation (4) is now considered. An example is shown in FIG. 5 in which the point of contact is located outwardly of the second straight line B. In the event that the outer circumferential curved surface D constituting the internal flow path of the turbine 12 is set as described above, as shown in the figure, the configuration of the inner circumferential curved surface E is caused to protrude extremely outwardly which is defined such that the cross-sectional area of the internal flow path is identical at any position along the length thereof (that is, the speed component of the circulating fluid inside the flow path becomes identical at any position along the length thereof). As a result of this, even if there is provided a smooth fluid flow on the outer circumferential side, a fluid flow on the inner circumferential side is disturbed, thereby causing a drawback that the fluid loss is increased. To counteract this, the flow path configuration is set such that the point P of contact is located inwardly of the straight line B.

As has been described heretofore, the torque converter of the present invention is advantageous over the related art ones, in particular, with a flat cross-section torque converter having the flatness of 75% or less where the flattening effect is large. The torque converter of the invention provides substantially a similar performance to that of the related art torque converter with the flatness of 85% until its flatness becomes 55%, but with the flatness of below 55% the performance thereof starts to be deteriorated. Thus, it is preferred that the torque converter of the invention is applied to those with the flatness of 55% to 75%.

Additionally, as to the torus inside and outside radius ratio (r/R), because when this ratio becomes smaller, the effective radii of the respective components of the torque converter decline, the torque absorbing capacity of the torque converter declines. For instance, the torque absorbing capacity of a torque converter with (r/R)=0.35is 40% less than that of a torque converter with (r/R)=0.38. On the other hand, when the torus inside and outside radius ratio (r/R) becomes larger, the torque converter is forced to be enlarged, thereby leading to an increase in weight and production cost of the torque converter. In view of these, it is preferred that the torus inside and outside radius ratio (r/R) is set to 0.35to 0.40.

As has been described heretofore, according to the present invention, in the flat cross-section torque converter which satisfies the equations (1) and (2), not only can the radius of curvature of the curve defining the flow path inside the turbine be reduced but also the internal flow path can be formed which can allow the fluid flow therein to deflect smoothly provided that the configuration of the flow path in the turbine member is set such that the position of the point of contact between the straight line inclined 45degrees relative to the X direction and the curve constituting the external circumferential surface of the flow path in the turbine member is located within the area surrounded by the first straight line which is expressed by the equation (3) and the second straight line expressed by the equation (4). This can help not only reduce the fluid loss (generation of eddy currents or the like) at the entrance portion to the turbine where a large fluid loss tends to be found but also improve the torque absorbing capacity and transfer efficiency of the torque converter. As a result of this, the torque converter can be obtained which has a flat cross-section and a small axial dimension, and provides a better torque converter performance.

While only certain embodiments of the invention have been specifically described herein, it will apparent that numerous modifications may be made thereto without departing from the spirit and scope of the invention.

What is claimed is:

1. A torque converter wherein in an axial cross-section of a fluid flow path formed through an impeller member, a turbine member and a stator member which constitute said torque converter, a flatness (2L/H) and a torus inside and outside radius ration (r/R) which are defined based on a distance 2L between axial ends of said flow path, a maximum radius R, a minimum radius r and a difference H (=R−r) between said maximum radius R and said minimum radius r satisfy equations:

$$0.55 < (2L/H) < 0.75$$

$$0.35 < (r/R) < 0.40$$

and wherein, in said axial cross-section, assuming that an axially central position of said flow path along a rotational shaft of said torque converter is an origin, an axial direction is an X direction and a radial direction is a Y direction, the configuration of said flow path is set such that the position of a point of contact between a straight line inclined 45degrees relative to said X direction and a curve constituting an external circumferential surface of said flow path in said turbine member is located with an area surrounded by:

a first straight line expressed as $Y=(R/L) \times X+(6/4) \times R$, and a second straight line expressed as $Y=(R/L) \times X+(7/4) \times R$.

2. A torque converter according to claim 1, wherein an internal circumferential surface of said flow path in said turbine member is formed such that the flow path cross-sectional area thereof becomes identical at any cross-sectional position along the length thereof.

* * * * *